J. A. WILEY.
Machine for Manufacturing Hydraulic Hose.
No. 161,463. Patented March 30, 1875.
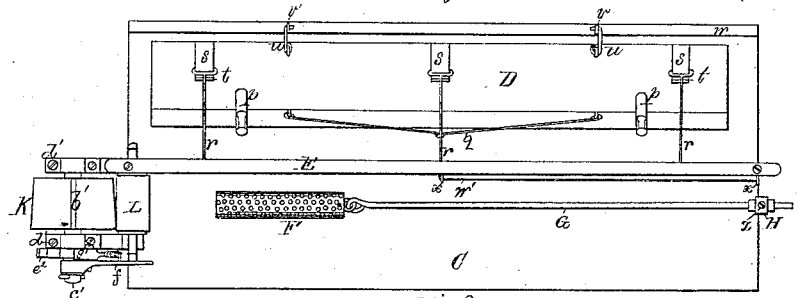
Fig.1.
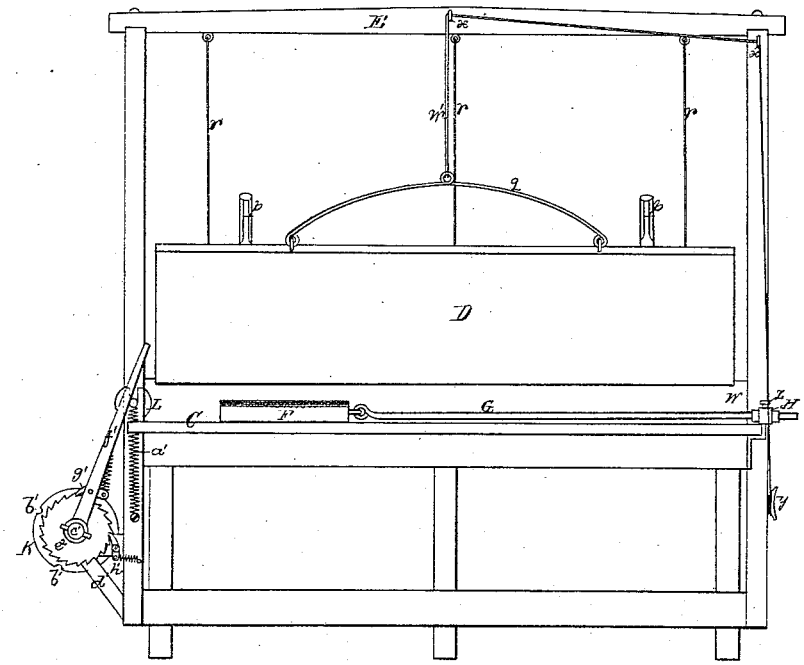
Fig.2.
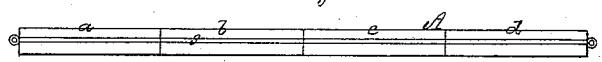
Fig.5.
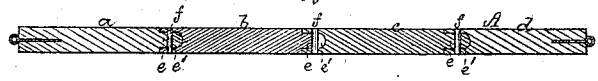
Fig.8.
Fig.7.
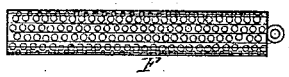
Witnesses.
S. N. Piper
L. N. Collins
John A. Wiley.
by his attorney
R. H. Eddy
THE GRAPHIC CO.PHOTO-LITH.39 & 41 PARK PLACE, N.Y.

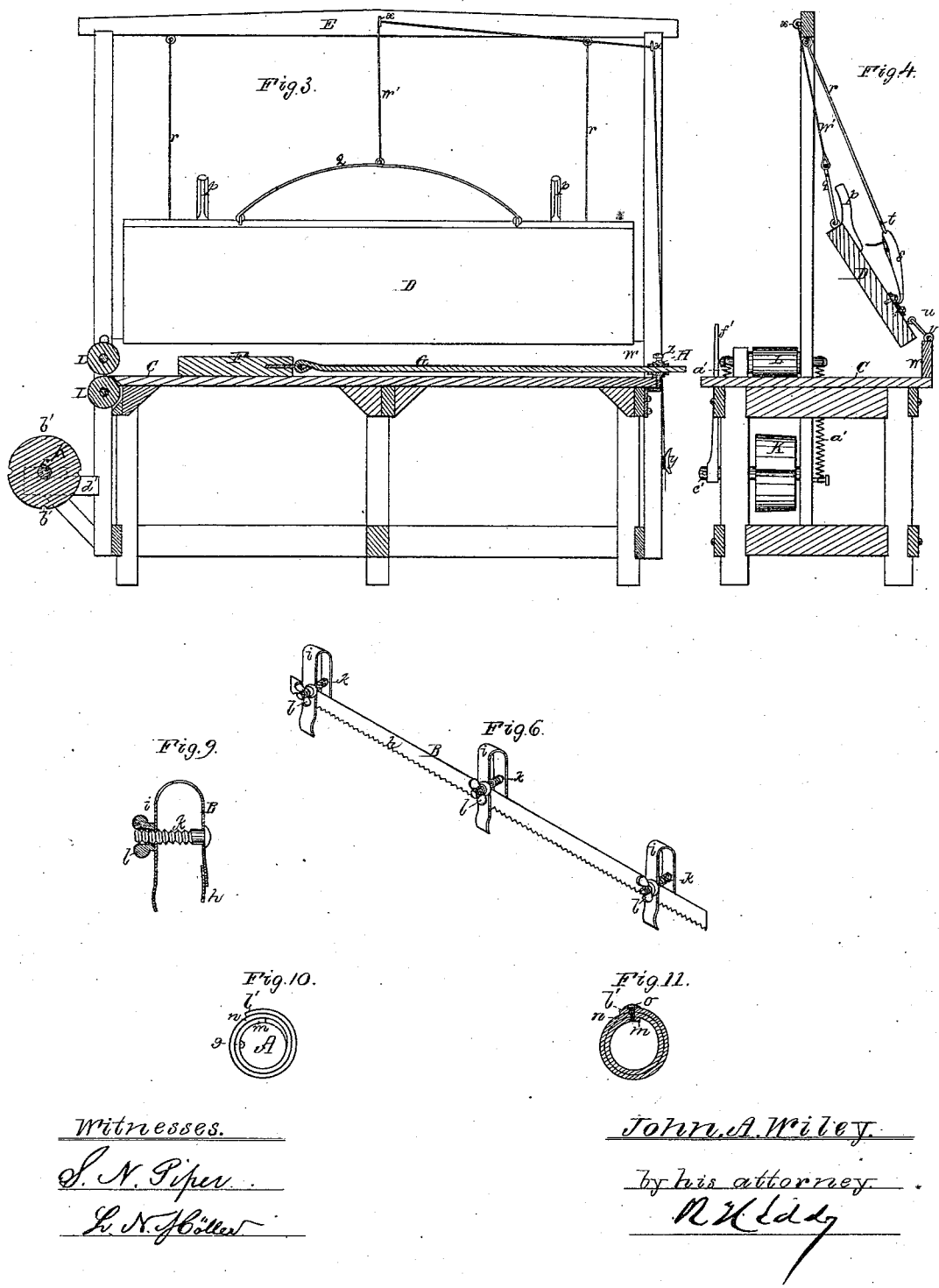

UNITED STATES PATENT OFFICE.

JOHN A. WILEY, OF NORTH ANDOVER, MASSACHUSETTS.

IMPROVEMENT IN MACHINES FOR MANUFACTURING HYDRAULIC HOSE.

Specification forming part of Letters Patent No. 161,463, dated March 30, 1875; application filed February 12, 1875.

*To all whom it may concern:*

Be it known that I, JOHN A. WILEY, of North Andover, of the county of Essex and State of Massachusetts, have made a new and useful invention, having reference to Manufacturing Hydraulic Hose; and do hereby declare the same to be fully described in the following specification, and represented in the accompanying drawings, of which—

Figure 1 is a top view, Fig. 2 a front elevation, Fig. 3 a vertical and longitudinal section, and Fig. 4 a transverse section, of a machine as used in making such hose. Fig. 5 is a top view of its sectional and channeled mandrel or former. Fig. 6 is a perspective view of the clamp used with such roller, and Fig. 7 is a top view of the nail-clincher, to be hereinafter described.

In making a piece of hydraulic hose by the said machine, a strip of cloth or other proper material of suitable length and width, and covered on both sides with vulcanizable india-rubber or composition, is first to be rolled transversely around a cylindrical former or mandrel, A, such as is shown in Fig. 5, and in longitudinal section in Fig. 8. This former or mandrel, as represented, is composed of several cylinders, $a\ b\ c\ d$, arranged with their axes in one straight line, and with a tenon, $e$, on the end of one to enter a mortise, $e'$, in the contiguous end of the next one, a pin, $f$, going transversely through the mortise and tenoned section, serving to hold them together. This pin is to be readily removable in order for the sections held together by it to be separated, as occasion may require. The tenon of the middle joint, however, I furcate or provide with a notch to receive the pin, in order that the parts may be there readily separated for the purpose of facilitating the extraction of the mandrel from the hose by pulling one-half of the mandrel therefrom in one direction, and the other half therefrom in the opposite way. The mandrel I groove or channel lengthwise from end to end, as shown at $g$, in order that air may freely pass into the hose while the mandrel half may be in the act of being extracted therefrom.

Were it not for the said groove or air channel, the pressure of the atmosphere would render it very difficult, if not impossible, to withdraw one-half of the mandrel from the hose with the other half therein.

By having the mandrel in sections, as set forth, it becomes adapted to the manufacture of hose of different lengths.

In applying to the mandrel a piece of cloth to be converted into a hose, an edge clamp, B, is used, it consisting of a long and thin bar, $h$, provided with a suitable number of bow springs or jaws, $i\ i\ i$, formed and arranged as shown, each of them being furnished with a clamp-screw, $k$, and nut $l$. The screw goes through the spring transversely in manner as shown in Fig. 9, which is a transverse section of the clamp taken through one of the spring-jaws thereof. The lower edge of the bar $h$ I usually serrate or provide with teeth, as shown, and I curve the bar transversely to fit, or nearly fit, the mandrel.

After the strip of cloth has been bent halfway around the mandrel, the clamp is to be applied so as to clamp the cloth to the mandrel, and particularly at the inner edge of the cloth, in order to prevent such edge while being rolled into contact with the cloth from becoming wrinkled or getting out of place. After the clamp may have been fixed to the cloth on the mandrel, the latter is to be rolled another half a revolution, or until the edge may be properly turned in, which having been accomplished, the clamp should be removed from the cloth, and the latter should be wound still farther around the mandrel, so as to form the roll of cloth with its edges lapped by one another, and on the cloth in manner as shown in Fig. 10, in which $l'\ m$ denote the two edges of the cloth, there being between them an intermediate fold, $n$.

After the hose may have been so made it is to be nailed or riveted together by rivets or clinched nails going through it, as shown at $o$ in Fig. 11. Previously, however, to the nailing or riveting being done, and before removing the mandrel from the hose, it becomes necessary to subject the hose to an operation termed "boarding" it.

In the drawings, the boarding-table is shown at C as provided with a boarder, D, of wood or metal, it being a rectangular plate somewhat larger than the hose, and having a width about four times or more the diameter of the bore. This boarder is furnished with handles $p\,p$, and a bail, $q$, arranged as shown, and is connected to a series of pendulous rods, $r\,r\,r$, by straps $s\,s\,s$ going through eyes of the rods, and provided with buckles $t$. The rods depend from a gallows-frame, E, erected on the boarding-table.

Furthermore, I usually provide the boarder with hooks $u$, to hook into staples $v$, arranged in a back-board, $w$, erected on the table at its rear edge, such hooks and staples being to hold the boarder back out of the way when it is triced up, by a rope, $w'$, fixed to the bail, and running through guides $x\,x$ to a belaying-cleat, $y$.

In order to perform the operation of boarding the hose, it, with the mandrel in it, is to be laid upon the top of the table, and the boarder should be turned down upon the hose, and be moved toward and away from the back-board $w$, so as to roll the hose forward and back upon the table, and compress together the folds of the cloth, so as to cause them to adhere throughout their surfaces in contact.

The boarding of the hose and the vulcanizing of it having been concluded, and the mandrel having been withdrawn from it, the next process of manufacture is that of riveting or nailing the hose. To this end I use a nail-clincher, F, which consists of a long block of metal, curved transversely on its upper surface, and there indented like a sewing-thimble. This clincher at one end is jointed to a rod, G, which is to slide freely through a standard, H, arranged at one end of the table, projected above such, and provided with a screw, $z$, to clamp the rod to such standard, all being as represented.

At the opposite end of the table is a pair of flattening-rollers, L L, the upper of them being forced down toward the other by springs $a'$ applied to its axle.

Furthermore, below the said rollers is a reeling or receiving roller, K, provided with a series of notches, $b'$, going transversely across its circumference. This roller may be slightly tapering. It is mounted on a shaft, $c^1$, duly supported in brackets or struts $d'$. The said shaft has a ratchet-wheel, $e^2$, fixed upon it, and is provided with a lever, $f'$, furnished with an impelling-pawl, $g'$, to operate the ratchet, there being arranged with the ratchet a retaining-pawl, $h'$, to prevent it from being revolved backward.

After having been formed on the mandrel, the hose is to be subjected to the vulcanizing process, after which it will be ready for being riveted or nailed. Having thus been treated, the hose is to be laid lengthwise on the table, and the clincher is to be introduced within the hose at one end of it, and the rod of the clincher should be inserted in and clamped to the standard H.

The laps or parts of the hose to be nailed should be directly over the clincher. Next, the hose, by means of a cord suitably fastened to its end next to the flattening-rollers, is to be connected with the periphery of the roller K. By revolving said roller, by means of the mechanism connected with it for such purpose, the hose may be drawn gradually off the clincher, and between the flattening-rollers, and wound upon the roll K. This movement of the hose is to be intermittent, in order that the attendant may properly nail or rivet the hose by driving nails through its laps, and down upon the clincher, by which their ends will be upset or clinched.

The flattening-rollers are to flatten the hose preparatory to it being rolled on the roller K, from which it may be subsequently removed, and coiled for use or sale.

Having thus described my new or improved art or mode of making a hydraulic hose, and the mechanism necessary thereto, what I claim as my invention is as follows:

1. The hose-former or mandrel A, made in sections $a\,b\,c\,d$, provided with tenons and mortises, as described.

2. The hose-former A, made in sections, as described, and provided with the air-channel $g$, extending through them, as set forth.

3. The hose edge-clamp B, composed of the bar $h$ and the series of bow-springs or clamps $i$, provided with clamping-screws, as set forth.

4. In combination with the table C, the boarder D, arranged with and applied to such table, substantially as and for the purpose specified.

5. In combination with the table C, the clincher F, and its rod G, arranged with and applied to the table, substantially as specified.

6. The combination of the flattening-rollers L L with the table C, the clincher F, and its rod G, applied to the table, as set forth.

7. The combination of the grooved receiving-roll K, provided with mechanism for operating it, as described, with the table C, the clincher F, and its rod G, applied to such table, as specified.

8. The combination of the table C, the grooved receiving-roller K, provided with mechanism for operating it, as described, the flattening-rollers L L, and the clincher F, applied to the table, all being arranged substantially as explained and represented.

JOHN A. WILEY.

Witnesses:
R. H. EDDY,
J. R. SNOW.